United States Patent [19]

Rottenkolber et al.

[11] 4,111,557

[45] Sep. 5, 1978

[54] METHOD FOR THE OPTICAL DETERMINATION AND COMPARISON OF SHAPES AND POSITIONS OF OBJECTS, AND ARRANGEMENT FOR PRACTICING SAID METHOD

[75] Inventors: Hans Rottenkolber, Amerang; Hans Steinbichler, Riedering, both of Fed. Rep. of Germany

[73] Assignee: OPTO Produkte AG, Zürich, Switzerland

[21] Appl. No.: 670,104

[22] Filed: Mar. 25, 1976

[30] Foreign Application Priority Data

Apr. 5, 1975 [DE] Fed. Rep. of Germany ....... 2514930

[51] Int. Cl.² .............................................. G01B 11/24
[52] U.S. Cl. ..................................... 356/168; 356/120
[58] Field of Search ............... 356/156, 163, 165, 120, 356/168

[56] References Cited

U.S. PATENT DOCUMENTS

| | | | |
|---|---|---|---|
| 2,574,119 | 11/1951 | Mottu | 356/163 |
| 2,607,267 | 8/1952 | Fultz et al. | 356/163 |
| 3,625,618 | 12/1971 | Bickel | 356/120 |
| 3,976,382 | 8/1976 | Westby | 356/156 |

Primary Examiner—John K. Corbin
Assistant Examiner—R. A. Rosenberger
Attorney, Agent, or Firm—Walter Becker

[57] ABSTRACT

The specification describes a method for the optical determination of departures in shape, changes in shape, and changes in position. In the method by means of light rays patterns are produced on the object and the patterns are represented by a photoelectronic device. Light rays originating from a coherent light source are projected by lenses or mirrors or holographically as a line or lines and/or point arrangements on an object, which are represented by means of an objective on an opto-electronic receiving device. In it they are converted into electric pulses, which after analog-digital conversion in an electronic computing unit are stored and are digitally coordinated with spatial coordinates. The data so obtained are compared with the data, obtained in the same manner, of the same object before its change in shape or position or with the data of an ideal or real object determining its ideal shape.

21 Claims, 6 Drawing Figures

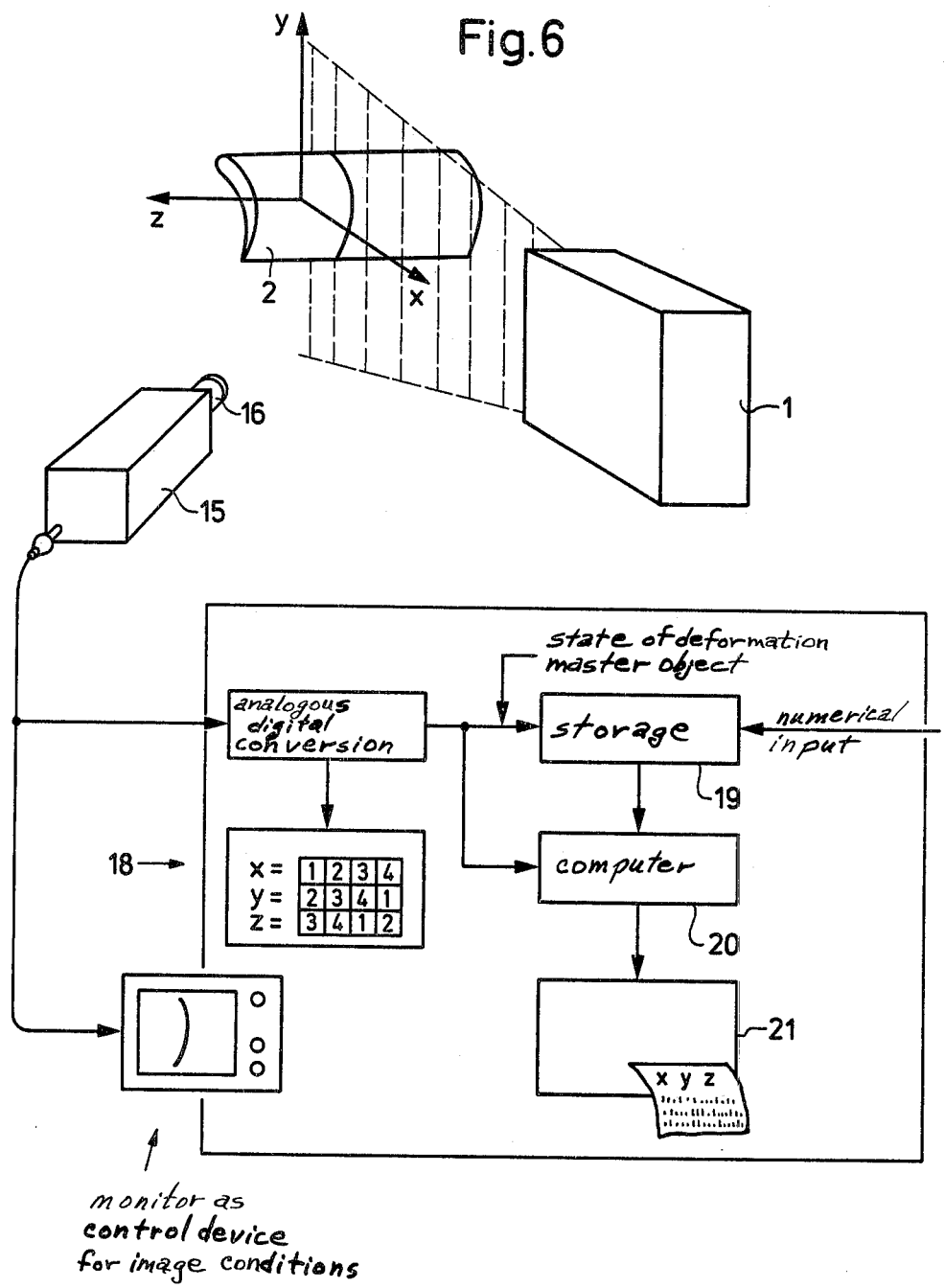

METHOD FOR THE OPTICAL DETERMINATION AND COMPARISON OF SHAPES AND POSITIONS OF OBJECTS, AND ARRANGEMENT FOR PRACTICING SAID METHOD

BACKGROUND OF INVENTION (1) Field to which Invention Relates

The invention relates to a method for the optical determination of departures in shape, changes in shape, and changes in position, in the case of which by means of light rays patterns are produced on the object and the patterns are represented by a photoelectronic device.

(2) The Prior Art

The wording used referring to determination of a departure in shape is to be understood to be a comparison between the actual shape of an object and its ideal shape, which is represented by a master object, a model after scale transformation or an ideal object which is determined only by computation or graphically.

By the reference to determining a change in shape and a change in position a comparison of the shape or position of one and the same object with respect to its changes in time is to be understood.

In addition to the departure in shape a departure in position of an object with respect to its ideal condition or state as defined by a master object, model, computed value or graphical representation is possible or it is also possible to make a comparison as regards a simple change in position or change in shape, for example when a turbine blade to be measured is twisted in its angle with respect to the axis of rotation of the turbine. The departure in position is however, from the point of view of the method technology employed here, only a subspecies of a departure in shape.

Determination and comparison, carried out with the highest degree of accuracy, of the shape in position of objects has become highly significant in technology and in what follows the important examples of application will be given:

In the production of complicated technical shapes, as for example turbine blades or blades of ships propellers the departure from the ideal state, both as regards the shape and also the position, must be determined in a true-to-shape examination. Oscillations of components can lead to the components breaking, especially if they occur close to the resonance range. Furthermore, they can cause substantial environmental trouble owing to radiation of sound or they may impair the functional efficiency of whole machines and plant as for example printing machines. In order to control such oscillations or vibrations, a knowledge of their shape and amplitude is necessary; In harmonic analysis it is possible, for example by comparison of two positions of the oscillating component, to obtain the necessary information. The deformation of components under static loading can lead to such components being damaged or destroyed. It is therefore necessary to avoid localised load peaks during design. The possibilities of solutions by calculation are often limited. It is however possible to determine in tests the positions of maximum loading by comparisons in shape between the loaded state and the unloaded state. Faults in materials, as for example flaws in the case of cast metals or separation into layers in the case of motor vehicle tires, can lead to irregular deformations under a pre-established load, which can be determined by a comparison as regards shape of the condition of the object before and on change in for example the ambient pressure or the thermal state of the object or of its static loading in material examination.

The certainly most familiar method of true-to-shape comparison is contact sensing or scanning of the article to be tested along one coordinate, in which respect reference points have to be established. It is possible to obtain the profile or contour in absolute values by the reading given on a clock gauge or digitally and the so established actual value can be compared with the values of a master sample or with calculated values. The requirements as regards working time and the number of personnel are however substantial. Laser technology makes possible a series of contact-free methods for true-to-ahspe comparison. In the case of one of these methods the laser beam is focussed on one point of the surface and the travelling time of the reflected beam is electronically measured in accordance with the radar principle. This method is used for example for the measurement of tire moulds. Holographic methods have as yet not found any acceptance in actual practice owing to their complicated performance. They can only be used to produce digital results with substantial calculating equipment using displacement factors (see Steinbichler et al.: "Quantitative Auswertung von Hologrammen" in Laser-Elektro-Optik No. 5/1973). In the lattice projection method previously proposed, but not as yet published these disadvantages are admittedly substantially circumvented and automatic evaluation is admittedly possible in this case but however it requires a high degree of complexity (German patent application No. 24 10 947.5). Finally, attention is also to be drawn to a non-laser technique derived by Takasaki, which is simple as regards the aspects of complexity and actual performance, but whose accuracy of measurement cannot be considered satisfactory (Takasaki: Moire Topography in "Applied Optics," 1970, pages 1467 to 72).

For haromic analysis so-called accelerational pickups or accelerometers are used, which can be arranged at specific points, for measuring vibrations or oscillations. Radiation of sound can be measured with suitable microphones. The detection of fields is based on a stationary condition. The holographic time-average method and double-pulse holography for aperiodic vibrations admittedly represented a substantial advance, however in this case as well the limitations mentioned in the case of holographic methods apply.

For static design optimisation numerous methods of measurement are available. These extend from punctuate determination of deformation with the help of sensors via strain gauges to photoelastic methods. In this context substantial advantages are offered by holographic interferometry. As compared with photoelastic methods, there are possibilities of measurement on the actual object while as compared with the strain gauge method there is the advantage of rapid provision of results. However, there is the disadvantage, apart from the degree of complexity, of the excessive sensitivity of the holographic method. Furthermore, the evaluation of holographic interferograms is problematical, since the total deformation vector makes a contribution to the interference display, while in general however only the vector components are relevant. More especially however digital representation gives rise to substantial difficulties.

In the case of the non-destructive testing of materials methods using ultrasonics, X-rays, thermography, and sound emission stand in the foreground, which are supplemented by the holographic method. Its high sensitivity admittedly has the advantage that the deformation necessary for indicating a fault is far removed from any damage or destruction. However, it involves the disadvantage that much complexity is called for in order to avoid the effect of ambient conditions as for example oscillations in the floor.

Holographic interferometry is at the present time the furthest advanced method in the sector coming into question. The advantage of the pictorial information which can be obtained with it and the very high accuracy of measurement has to be weighed up against the disadvantage of the complicated apparatus and the complex operational steps required and furthermore the necessity of cancelling out and avoiding ambient effects. These disadvantages impair or prevent however the direct use of these methods in industrial production.

SUMMARY OF INVENTION

The aim of the present invention was therefore the development of a method which operates using simple equipment which is not liable to defects and can be used directly in industrial production. The method should be capable of detecting optically departures in shape, changes in shape, and changes in position with a degree of accuracy comparable with that of holographic methods, and converting such changes in departures into digital values.

This aim in accordance with the invention is achieved in that light rays originating from a coherent light source are projected by lenses or mirrors or holographically as a line or lines and/or point arrangements on an object, and that this line, these lines or point arrangements are represented by means of an objective on an optoelectronic receiving device and in it are converted into electric pulses, and that these pulses, after analog-digital conversion in an electronic computing unit are stored and are digitally coordinated with spatial coordinates, and that the data so obtained are compared wth the data, obtained in the same manner, of the same object before its change in shape or position or with the data of an ideal or real object determining its ideal shape.

As a source for the light rays used it is convenient to make use of a laser. Owing to its spatially coherent properties the laser ray can be focussed down to very sharply delimited points or lines. Although this focussing or projection strictly speaking only applies for one plane, owing to the small aperture of the ray relatively high depth of field are obtained, which are necessary for measuring curved surfaces. The points or lines can be produced both with lens or mirror optic systems and also holographically. A single point or a single line is produced for the sake of simplicity with a lens or mirror optic system. If several points or lines or curved lines are required simultaneously for measurement, a holographic projection is particularly suitable. The holographic method furthermore has the advantage that owing to simple replacement of the hologram a rapid adaptation change in conditions at the object or at the objects becomes possible. By changing the angle of the reference ray with respect to the image plane of the hologram it is also possible to produce such adaptation. Since holograms can be produced with very high degrees of efficiency, the light loss in the case of these methods is negligible.

Lines or points can be caused to pass over whole fields on an object by turning the projection means or by other measures as for example by ray deflection. By this resolution in time, which however assumes stationary conditions, it is also possible to measure large ranges or fields on the object. A check of the stationary conditions can be carried out by projecting on non-deforming surface fields of one and the same object, or in the case of different objects to be compared, on surface fields which are the same and are not subject to departures in shape, simultaneously the projected lines of at least three reference points, whose position is stored in the computing unit and they are compared by the latter with their change position in the case of one and the same object or with the position of the corresponding points on the object to be compared after carrying out a coordinate transformation, by means of which the positional change of the object and of the object to be compared are suppressed in relation to the object in order to determine only the pure change in shape or only the pure departure in shape.

The representation of the lines and point arrangements projected onto the object on the receiving surface of the optoelectronic arrangement can be brought into coincidence with the representation of the lines or point arrangements after the departure in shape, change in shape or change in position of the object or objects in the computing unit by a coordinate transformation with a high degree of approximation. As a result it is also possible to suppress changes in position in favour of investigation of changes in shape or however vice versa it is possible to determine the change in position or departure in position neglecting the change in shape. On the other hand, the projected reference points can be used for adjusting the object by bringing the projected points into coincidence with marks on the object or certain features of shape of this object, for example corners.

The object for comparison determining the ideal shape used for determining departures in shape does not in any way lead to be a real object which is true in scale. The ideal shape can be fed in the form of digital values into the computing unit. Furthermore, the line, the lines or the point arrangements can be projected onto a model representing the enlarged or reduced ideal shape of the object and the values resulting in the optoelectronic arrangement, of the representation of the lines or point arrangements in the computing unit can be converted in a scale transformation into the values or data of the ideal shape of the object.

The method described can be used for measurement of the absolute shape of an object, for true-to-shape examination and for shape and position both of a static and also a dynamic type, for example for measurement of vibrations or oscillations. A sub-species of a change in shape is the measurement of the filling level of liquids, in the case of which the position or displacement of the surface of the liquid is determined. The method in accordance with the invention can furthermore be used for measuring the speed of a moving object, in the case of which its change in position can be determined within a certain time or the duration of a certain change in position can be determined.

If large surfaces are to be measured instead of a single line, several lines, for example parallel ones, can be simultaneously projected or with one line the whole surface can be scanned by swinging or turning the projecting device. Furthermore, in the case of large objects it is possible to use more than one projecting arrangement with its respective receiving devices coordinated with it, which for their part have a computing unit, and in which case the projection and receiving arrangements must have a fixed three-dimensional relationship to each other, this relationship having to be fed into the computing unit as reference values or data.

The photoelectronic receiving device can be a TV camera or however a single photodiode providing a yes-no form of data if only the position of a certain projected point is to be determined, as can be the case in harmonic analysis. Using the single photodiode it is also possible to scan the image in steps or lines. For the representation of extended line or point patterns it is possible to make use of a photodiode array or a photodiode matrix or a Schottky detector. In order to obtain digital data in the case of the use of a TV camera in the computing unit counted clock pulses can be superimposed using a clock on the scanning electron ray.

LIST OF SEVERAL VIEWS OF DRAWINGS

Embodiments of the invention are described in detail in what follows and represented in the accompanying drawings.

FIG. 6 shows diagrammatically an arrangement of equipment for carrying out the method in accordance with the invention.

DESCRIPTION OF PREFERRED EMBODIMENTS

Figure 1:
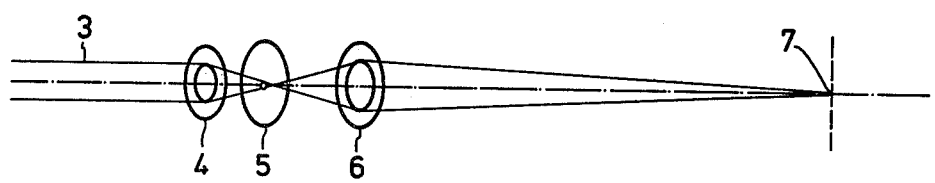
FIGS. 1 to 3 show various forms of the ray path in the case of a projection arrangement in accordance with the invention using lenses and mirrors.

As is represented in FIG. 6 a line is projected by the projection arrangement 1 onto the object 2, which is a turbine blade, which is being investigated as regards its true shape. The projection arrangement is accommodated in a box-shaped container, in which a laser is provided as a light source. The rays 3 (FIGS. 1 to 3) leaving the laser are, if a punctuate projection is desired, focussed by the lens 4, as shown in FIG. 1, onto a pinhole 5 with a very small aperture. By means of the objective 6 this focussed ray is projected onto the object at 7 as a point. If a projection in the form of a line is required, following the objective 6, a cylindrical lens 8 is arranged in the ray path, by means of which the projected points are drawn apart to form a line, which is projected onto the object at 9. In lieu of the cylindrical lens 8 it is possible, as is shown in FIG. 3, to arrange a cylindrical mirror 10 in the ray path after passage of the rays through the ray dividing or splitting cube 11. The rays reflected by it and projecting a line are laterally deflected by the ray splitting cube 11.

Figure 4:
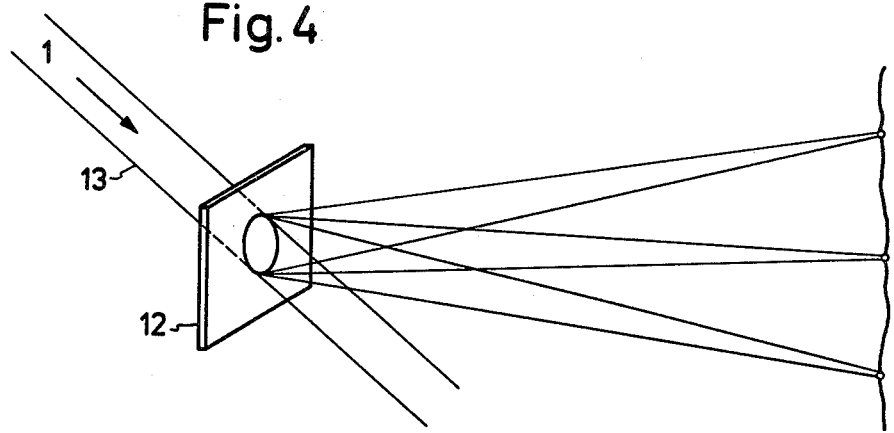
FIGS. 4 and 5 show various representations of the ray path in a holographic projection arrangement in accordance with the invention.
Figure 5:
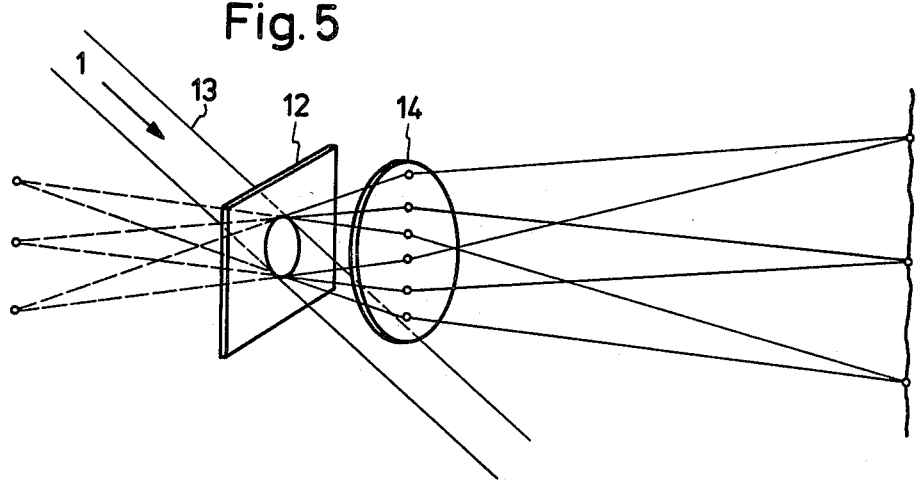

If complicated patterns are to be projected, as is usually necessary, for example a line and three points, holographic projection is to be preferred, as is represented in FIGS. 4 and 5. In the hologram 12 points or lines are stored.

By illumination of the hologram 12 with a reference ray 13 the points or lines are produced by diffraction. It is then possible to project its real image, as is shown in FIG. 4, or its virtual image (in the case of the use of the intermediate objective 14) onto the object, as this is shown in FIG. 5.

Figure 2:
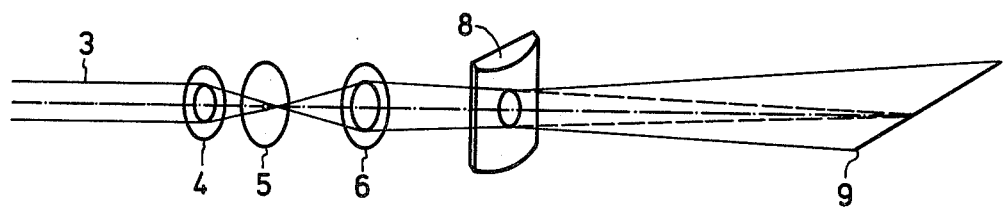
Figure 3:
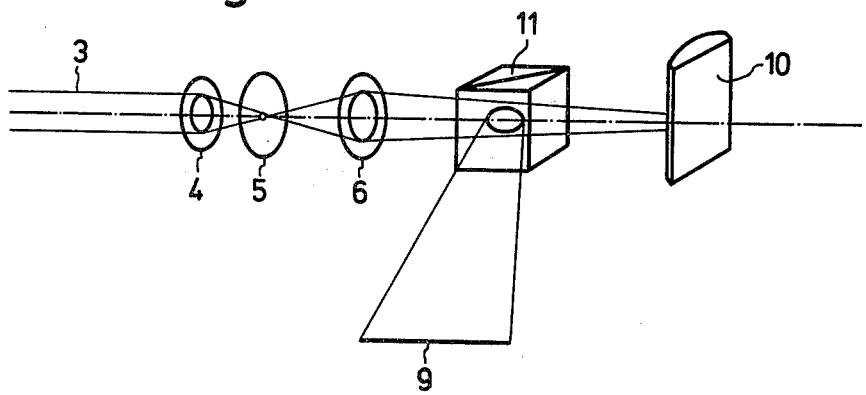

Owing to the small aperture in the case of the arrangement in accordance with FIGS. 1 to 3 and in the holographic method it is possible to achieve sufficient depth of focus in order over the whole curvature of the surface of the object 2 a very sharp representation, making possible extremely accurate measurements, of the points and lines.

The receiving arrangement 15, which for its part is accommodated in a box-shaped container, has an objective 16, which projects the line and point pattern, projected on the object, on a photoelectronic receiving surface, which can be the receiving surface of a TV camera or a photodiode matrix. In the first case a clock generator runs with each line of the TV image and this generator produces 1000 clock pulses per line. Simultaneously in the computing unit 18 a counter registers the clock pulses. The local signal $x$ then occurs after a certain number of clock pulses at the point of intersection of the line with the image of the projected point or of the projected line. The number of clock pulses counted up till this juncture represents the desired digital value.

In the case of a photodiode array each line is performed with a stepping motor. The local signal $x$ then occurs owing to the photodiode acted upon and therefore occurs already as a digital value just as is the case with the digital value of the respective line.

The digital values or data obtained are passed to the computing unit 18, where the measured data $x$ is fed in as a function of $y$ and $z$ into the storage 19. In the case of the use of only one photodiode, for example for measuring the level of filling, only one value of $x$ occurs, which can then appear in a digital display. In the case of a departure in shape, deformation or change in position firstly the data of the master object or of the original condition of the object are stored and these data can be fed also directly in via the storage 19, for example as computed data. At the test object or, respectively, after deformation or change in position at the test object in the same manner the values for $x$, $y$, and $z$ are determined and passed to the storage 19. The stored values then flow to the computer 20, which carries out the comparison between the actual and ideal condition or, respectively, between the original and the test condition by forming a difference. This constitutes a measurement of the departure in shape or, respectively, of the difference in position, which is converted into units of lengths, for example in millimeters. By the use of a single coordinate transformation the influence of the relative movement between the object and the measurement set up can be taken into account.

The data output unit 21 can finally be a curve plotter ($x$, $y$ plotter), a printer or a digital display with luminescent figures. For checking purposes a monitor can be connected with the receiving arrangement.

In order to avoid relative movements between the object 2 on the one hand, and the projection arrangement 1 and the receiving arrangement 15 on the other hand, the projection arrangement and/or the receiving arrangement can be arranged in a fixed manner on the object.

It is, of course, to be understood that the invention is, by no means, limited to the specific showing in the drawings, but also comprises any modifications within the scope of the appended claims.

What we claim is:

1. In a method for optical determination of departures in shape, changes in shape and changes in position, the improvement therewith which comprises in combination the steps of generating a light pattern upon an object with a beam of coherent light sided by image-forming optical elements, reproducing this pattern by means of an objective upon an opto-electronic receiver device, converting this pattern into electrical impulses, storing these impulses in an electronic computer after analog-digital conversion thereof, allotting digitally the converted inpulses into space coordinates and finally comparing the resulting values of space coordinates with correspondingly obtained values of the same object prior to change of position of at least one of the surface points thereof, there being providing of lines and point arrangements as the pattern generated upon the object.

2. A method in combination according to claim 1, wherein changing of position of the surface points results through change of form of the object.

3. A method in combination according to claim 1, wherein changing of position of the surface points results through change of position of the object.

4. A method in combination according to claim 1, wherein said comparing involves an object with a master object.

5. A method in combination according to claim 4, wherein there is differing size for the master object than for the object, and recalculating and storing of image thereof occurs in the computer to size of the object.

6. A method in combination according to claim 1, wherein there is providing of a hologram storing the pattern to be generated upon the object by the image-forming elements.

7. A method in combination according to claim 1, wherein there is aligning of the object by means of point arrangement generated thereon.

8. A method in combination according to claim 1, wherein there is utilizing thereof for measuring of the absolute form of the object.

9. A method in combination according to claim 1, wherein there is utilizing thereof for measuring of the trueness of form of an object.

10. A method in combination according to claim 1, wherein there is utilizing thereof for measuring static and dynamic deformation.

11. A method in combination according to claim 1, wherein there is utilizing thereof for measuring filling level of fluids.

12. A method in combination according to claim 1, wherein there is utilizing thereof for measuring of spped of a moving object.

13. In a method for optical determination of departures in shape, changes in shape and changes in position, the improvement therewith which comprises in combination the steps of generating a light pattern upon an object with a beam of coherent light aided by image-forming optical elements, reproducing this pattern by means of an objective upon an opto-electronic receiver device, converting this pattern into electrical impulses, storing these impulses in an electronic computer after analog-digital conversion thereof, allotting digitally the converted impulses into space coordinates and finally comparing the resulting values of space coordinates with correspondingly obtained values of the same object prior to change of position of at least one of the surface points thereof, there being providing of lines and at least three reference points as the pattern generated upon non-deformed upper surface regions of the object, and storing thereof occurs in the computer for comparison of changed positioning thereof after carrying out a coordinate transformation through which there is suppressing of changes of positioning of the object.

14. A method in combination according to claim 13, wherein there is providing of lines as the pattern generated upon the object.

15. A method in combination according to claim 13, wherein there is generating of reference points upon upper surface regions with known deformation.

16. A method in combination according to claim 13, wherein there is applying of reference points upon the object and upon corresponding surface regions of a comparison object.

17. A method in combination according to claim 16, wherein there is introducing of the image of the comparison object as digital values in the computer.

18. A method in combination according to claim 13, wherein there is substantial overlapping of the image of the pattern generated upon the object on the receiving surface of the opto-electronic receiver device with respect to the image of this pattern after changing of the object in the computer through a coordinate transformation.

19. In a measuring arrangement for optical transmission of departures in shape, changes in shape and changes in position and having a laser provided as a light source therewith in which optical elements are provided to form images of beam pasage and with which the beams proceeding from the laser can form a pattern of lines and point arrangements upon an object and in which an optical receiver device is provided wherein this pattern can be formed upon a photo-electronic surface and in which this pattern is converted into electrical impulses and finally having provided therewith an electronic computer, the improvement in combination therewith which comprises storage means for these impulses after analog-digital conversion thereof, and means for comparing therewith digital values of form and position of a changed object obtained in the same manner with respect to the form of a different object.

20. An arrangement in combination according to claim 19, wherein a hologram is provided for the optical image-forming elements to store the pattern to be generated upon the object.

21. An arrangement in combination according to claim 19, wherein there is provided more than one image-forming arrangement with corresponding receiver devices as well as corresponding computer therewith respectively to receive electrical impulses converted in the receiver device, whereby this image-forming and receiver arrangements among themselves provide a fixed space relationship introduced into the cmmputer as a reference value.

* * * * *